US012665241B2

(12) United States Patent
Onuki

(10) Patent No.: US 12,665,241 B2
(45) Date of Patent: Jun. 23, 2026

(54) TEMPERATURE RAISING SYSTEM

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 706 days.

(21) Appl. No.: 17/896,110

(22) Filed: Aug. 26, 2022

(65) Prior Publication Data

US 2023/0062107 A1 Mar. 2, 2023

(30) Foreign Application Priority Data

Sep. 1, 2021 (JP) ................................. 2021-142638

(51) Int. Cl.
H01M 10/657 (2014.01)
H01M 10/42 (2006.01)
H01M 10/615 (2014.01)

(52) U.S. Cl.
CPC ..... H01M 10/657 (2015.04); H01M 10/4264 (2013.01); H01M 10/615 (2015.04); *H01M 2220/20* (2013.01)

(58) Field of Classification Search
CPC ........................ H01M 10/657; H01M 10/4264
See application file for complete search history.

(56) References Cited

U.S. PATENT DOCUMENTS 6,078,163 A 6/2000 Horie et al.
2009/0134718 A1* 5/2009 Hurst .................. H01M 50/512
29/428

2013/0033232 A1* 2/2013 Kosugi ............... H01M 10/637
320/128
2014/0253046 A1 9/2014 Poznar
2014/0329113 A1 11/2014 Han et al.
2021/0053463 A1 2/2021 Woo et al.
(Continued)

FOREIGN PATENT DOCUMENTS

CN 105680114 6/2015
CN 108054468 5/2018
CN 109166985 1/2019
(Continued)

OTHER PUBLICATIONS

Japanese Office Action for Japanese Patent Application No. 2021-142638 mailed Nov. 26, 2024.
(Continued)

*Primary Examiner* — Maria Laios
*Assistant Examiner* — Benjamin T Lustgraaf
(74) *Attorney, Agent, or Firm* — Amin, Turocy & Watson, LLP

(57) ABSTRACT

A temperature raising system includes an alternating current (AC) generation circuit connected to a power storage battery including one or more power storages and configured to generate an AC current, and a conductive member of a metallic conductor connected between a terminal portion of the power storage and the AC generation circuit or between two or more power storages. The conductive member includes a first path and a second path along which heat is generated by allowing the AC current to flow. The first path has a larger inductance component than the second path.

4 Claims, 7 Drawing Sheets

(56) References Cited

U.S. PATENT DOCUMENTS

| | | | |
|---|---|---|---|
| 2021/0218085 A1* | 7/2021 | Ge | H01M 10/486 |
| 2023/0263230 A1 | 8/2023 | Riva Reggiori et al. | |

FOREIGN PATENT DOCUMENTS

| | | |
|---|---|---|
| CN | 112406579 | 2/2021 |
| CN | 215451553 | 1/2022 |
| DE | 102010034439 | 2/2012 |
| JP | 60-069407 | 5/1985 |
| JP | 2000-228231 | 8/2000 |
| JP | 2010-182511 | 8/2010 |
| JP | 2011-146183 | 7/2011 |
| JP | 4940490 | 5/2012 |
| JP | 5096842 | 12/2012 |
| JP | 5293820 | 9/2013 |
| JP | 2014-087081 | 5/2014 |
| JP | 2014087081 A * | 5/2014 |
| JP | 2020-004532 | 1/2020 |
| JP | 2023-533791 | 8/2023 |

OTHER PUBLICATIONS

Japanese Notice of Allowance for Japanese Patent Application No. 2025-008527 mailed Oct. 28, 2025.
Japanese Notice of Allowance for Japanese Patent Application No. 2025-008528 mailed Oct. 28, 2025.
Chinese Office Action for Chinese Patent Application No. 202211013415.3 mailed Nov. 14, 2025.
Chinese Notice of Allowance for Chinese Patent Application No. 202211013415.3 mailed Mar. 31, 2026.

* cited by examiner (b)

TEMPERATURE RAISING SYSTEM

CROSS-REFERENCE TO RELATED APPLICATION

Priority is claimed on Japanese Patent Application No. 2021-142638, filed Sep. 1, 2021, the content of which is incorporated herein by reference.

BACKGROUND OF THE INVENTION

Field of the Invention

The present invention relates to a temperature raising system.

Description of Related Art

Efforts are underway to reduce adverse effects on the global environment (for example, reduction of $NO_x$ and $SO_x$ or reduction of $CO_2$). Thus, in recent years, from the viewpoint of improving the global environment, for reduction of $CO_2$, there is growing interest in at least electric vehicles allowed to travel with electric motors driven by power supplied by batteries (secondary batteries) such as, for example, a hybrid electric vehicle (HEV) and a plug-in hybrid vehicle (PHEV). The use of a lithium-ion secondary battery is being considered as a battery for in-vehicle use. In these electric vehicles, it is important to fully bring out the performance of the secondary battery. It is known that the charging/discharging performance of a secondary battery deteriorates when the temperature at the time of use drops below an appropriate range. It is possible to limit the deterioration of the charging/discharging performance of the secondary battery by raising the temperature to a suitable temperature at the time of use.

By the way, for example, Japanese Patent No. 4940490 and Japanese Patent No. 5096842 disclose technology for cooling the inside of a battery by cooling a terminal portion of the battery. For example, as disclosed in Japanese Patent No. 4940490, a contact area between the terminal portion and a heat radiating member is widened by allowing the heat radiating member to come into contact with an end surface of the terminal portion of the battery and heat is transferred from the terminal portion to the heat radiating member more efficiently. These conventional technologies are implemented to radiate heat from the battery efficiently by utilizing the suitable heat transfer between the terminal portion of the battery and the inside of the battery. From this, in contrast, it is also conceivable to raise the temperature efficiently by warming the terminal portion when the temperature of a secondary battery is raised.

On the other hand, for example, Japanese Patent No. 5293820 discloses technology related to a temperature raising device for raising the temperature of a secondary battery. In the temperature raising device disclosed in Japanese Patent No. 5293820, the temperature of the secondary battery is raised by positively generating a ripple current of a prescribed frequency of a frequency range in which an absolute value of impedance is relatively decreased in the secondary battery on the basis of frequency characteristics of impedance of the secondary battery.

SUMMARY OF THE INVENTION

By the way, when it is conceivable to raise the temperature of a secondary battery by combining the conventional technologies, it is conceivable to allow a metallic member (a heat radiating member in Japanese Patent No. 4940490 and Japanese Patent No. 5096842) to generate heat by allowing a high-frequency alternating current (AC) current to flow through the metallic member in contact with a terminal portion of the secondary battery. In this case, it is necessary to increase a resistance value of the metallic member such that an AC current flows through the metallic member and more heat is generated. However, if the resistance value of the metallic member is increased, the increased resistance value may affect the normal charging/discharging characteristics of the secondary battery. For example, if the metallic member generates heat due to the current flowing during normal charging/discharging, the temperature will be raised even though it is unnecessary to warm the secondary battery.

The present invention has been made on the basis of the above recognition of the problems and an objective of the present invention is to provide a temperature raising system capable of raising the temperature of a secondary battery if necessary and improve energy efficiency by allowing a high-frequency AC current to flow and generating heat while limiting heat generation due to a current flowing during normal charging/discharging of the secondary battery.

A temperature raising system according to the present invention adopts the following configurations.

(1): According to an aspect of the present invention, there is provided a temperature raising system including: an AC generation circuit connected to a power storage battery including one or more power storages and configured to generate an AC current; and a conductive member of a metallic conductor connected between a terminal portion of the power storage and the AC generation circuit or between two or more power storages, the conductive member including a first path and a second path along which heat is generated by allowing the AC current to flow, the first path having a larger inductance component than the second path.

(2): In the above-described aspect (1), in the conductive member, the first path includes a first resistance component and an inductance component, the second path includes a second resistance component, and a resistance value of the second resistance component is larger than a resistance value of the first resistance component.

(3): In the above-described aspect (2), the first path includes a reactor having the first resistance component and the inductance component, and the second path includes a resistor having the second resistance component.

(4): In the above-described aspect (2), the first path includes a metallic conductor having the first resistance component and a magnet surrounding the metallic conductor, and the second path includes a resistor having the second resistance component.

(5): According to an aspect of the present invention, there is provided a temperature raising system including: an AC generation circuit connected to a power storage battery including one or more power storages and configured to generate an AC current; and a conductive member of a metallic conductor connected between a terminal portion of the power storage and the AC generation circuit or between two or more power storages, the conductive member including a magnet configured to surround the metallic conductor and generate heat due to an AC magnetic field based on the AC current.

(6): According to an aspect of the present invention, there is provided a temperature raising system including: an AC generation circuit connected to a power storage battery including one or more power storages and configured to generate an AC current; and a conductive member of a metallic conductor connected between a terminal portion of the power storage and the AC generation circuit or between two or more power storages, the conductive member including a first path and a second path which branches from the first path and along which heat is generated by allowing the AC current to flow, the second path including a resistor.

(7): In the above-described aspect (1), the AC generation circuit includes a first capacitor having a first end connected to a positive electrode side of the power storage and a second capacitor having a first end connected to a negative electrode side of the power storage and generates the AC current according to a resonance operation of an inductance component provided in the power storage and at least the first capacitor by switching a connection of the first capacitor and the second capacitor to the power storage to a series connection or a parallel connection.

According to the above-described aspects (1) to (7), it is possible to raise the temperature of a secondary battery if necessary and improve energy efficiency by allowing a high-frequency AC current to flow and generating heat while limiting heat generation due to a current flowing during normal charging/discharging of the secondary battery.

BRIEF DESCRIPTION OF THE DRAWINGS

FIG. 8 is a diagram showing an example of a structure of a busbar of a third embodiment.

DETAILED DESCRIPTION OF THE INVENTION

Hereinafter, embodiments of a temperature raising system of the present invention will be described with reference to the drawings. As used throughout this disclosure, the singular forms "a," "an," and "the" include a plurality of references unless the context clearly dictates otherwise.
[Configuration of Temperature Raising System]

Figures 1, 2:
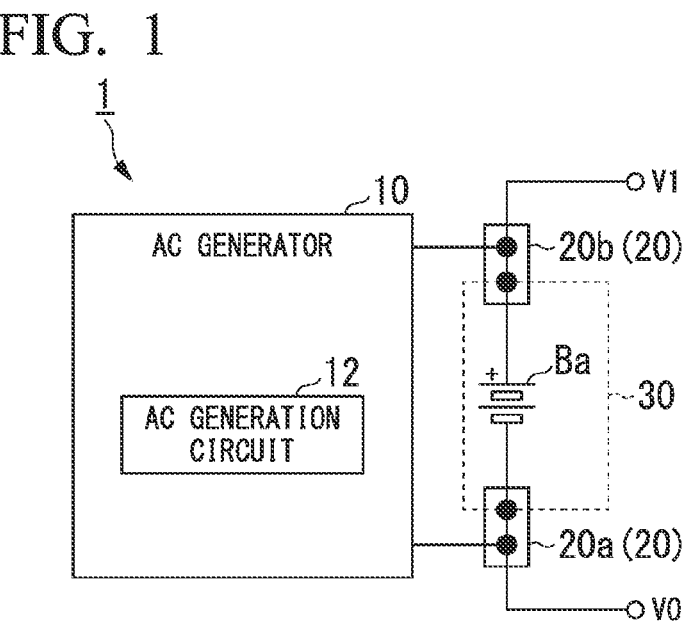
FIG. 1 is a diagram showing an example of a configuration of a temperature raising system according to an embodiment.
FIG. 2 is a diagram showing an example of a configuration of an AC generation circuit provided in the temperature raising system.

FIG. 1 is a diagram showing an example of a configuration of a temperature raising system according to an embodiment. A temperature raising system 1 includes, for example, an AC generator 10 including an AC generation circuit 12 and busbars 20. In FIG. 1, a battery 30 whose temperature is raised in the temperature raising system 1 is also shown. In FIG. 1, a state in which the busbars 20 (a busbar 20a and a busbar 20b) are connected to terminal portions of a positive electrode side and a negative electrode side of the battery 30 is shown.

The battery 30 is, for example, a battery (a secondary battery) for traveling mounted in a hybrid electric vehicle (HEV) (hereinafter simply referred to as a "vehicle M") that travels by combining driving of an electric motor using supplied power and driving of an internal combustion engine using fuel as an energy source, such as, for example, a diesel engine or a gasoline engine. The battery 30 includes, for example, a secondary battery capable of being iteratively charged and discharged, such as a lithium-ion battery, as a power storage unit Ba. The battery 30 is discharged to supply electric power stored in the power storage unit Ba and supplies the electric power to the electric motor connected to a terminal V0 side and a terminal V1 side and is charged with electric power supplied from the terminal V0 side and the terminal V1 side, for example, when the electric motor operates as a regenerative brake using kinetic energy during deceleration of the vehicle M to generate electric power. The battery 30 is an example of a "power storage" or a "power storage battery" in the claims.

The temperature raising system 1 increases (raises) the temperature of the battery 30 to a preferred temperature at the time of use to limit the deterioration of the charging/discharging performance of the battery 30. The activation and stopping of the temperature raising system 1 is controlled by, for example, a control device such as an electronic control unit (ECU) provided in the vehicle M.

The AC generator 10 generates a high-frequency AC current for heating the busbar 20 through the AC generation circuit 12. The busbar 20 is, for example, a conductive member mainly formed of a metallic conductor such as copper. The busbar 20 is connected to the terminal portion of the battery 30. In normal charging/discharging of the battery 30, the busbar 20 allows a current (a charging/discharging current) to flow between the battery 30 and the terminal V0 side and the terminal V1 side. The charging/discharging current is a direct current (DC) current or an AC current having a lower frequency than the AC current generated by the AC generator 10. When the AC current generated by the AC generator 10 is applied (flows), the battery 30 generates heat in accordance with the AC current. By transferring the heat generated by the busbar 20 to the terminal portion of the battery 30, the heat is further transferred to the inside of the battery 30 and the temperature of the battery 30 is raised. This is because the terminal portion of the battery 30 is connected to the inside of the battery 30 by a metallic material and hence heat is suitably transferred to the entire battery 30. The busbar 20 is an example of a "conductive member" in the claims.
[Example of Configuration of AC Generator]

FIG. 2 is a diagram showing an example of a configuration of the AC generator 10 provided in the temperature raising system 1. The AC generator 10 includes, for example, an AC generation circuit 12 and a controller 14. The busbars 20 (the busbar 20a and the busbar 20b) provided in the temperature raising system 1 and the battery 30 are also shown in FIG. 2. In the battery 30, for example, resistance Ra and inductance La are connected in series on the positive electrode side of the power storage unit Ba. The inductance La is an example of an "inductance component of the power storage" in the claims.

The AC generation circuit 12 includes, for example, a capacitor C1, a capacitor C2, a switch S1, a switch S2, and a switch S3. The capacitor C1 and the capacitor C2 are capacitors having the same capacitance. Control is performed such that each of the switch S1, the switch S2, and the switch S3 is in a conductive state (a closed state) in which a connection between both terminals thereof is made or a non-conductive state (an open state) in which the connection between both terminals thereof is disconnected in accordance with a control signal output by the controller 14. Each of the switch S1, the switch S2, and the switch S3 may be a semiconductor switching element that is controlled such that it is in an ON state or an OFF state such as, for example, an N-channel type metal oxide semiconductor field effect transistor (MOSFET).

In the AC generation circuit 12, a first end of the capacitor C1 is connected to the positive electrode side of the battery 30 and a first end of the capacitor C2 is connected to the negative electrode side of the battery 30. Further, in the AC generation circuit 12, a first terminal of the switch S2 is connected to the first end of the capacitor C1 and a second terminal of the switch S1 is connected to the first end of the capacitor C2. In the AC generation circuit 12, the first terminal of the switch S1 and a second terminal of the switch S3 are connected to a second end of the capacitor C1 and a second terminal of the switch S2 and a first terminal of the switch S3 are connected to a second end of the capacitor C2. In the AC generation circuit 12, the capacitor C1 is an example of a "first capacitor" in the claims and the capacitor C2 is an example of a "second capacitor" in the claims.

When the temperature raising system 1 is activated, the controller 14 switches the connection of the capacitor C1 and the capacitor C2 to the battery 30 side to a parallel connection or a series connection by setting each switch provided in the AC generation circuit 12 in the conductive state or the non-conducting state. More specifically, the controller 14 alternately switches the state between a state in which the capacitor C1 and the capacitor C2 are connected to the battery 30 side in parallel by setting the switch S1 and the switch S2 in the conductive state and setting the switch S3 in the non-conductive state and a state in which the capacitor C1 and the capacitor C2 are connected to the battery 30 side in series by setting the switch S1 and the switch S2 in the non-conductive state and setting the switch S3 in the conductive state.

The controller 14 operates, for example, when a hardware processor such as a central processing unit (CPU) executes a program (software). The controller 14 may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The controller 14 may be implemented by a dedicated LSI circuit. The program may be prestored in a storage device (a storage device including a non-transitory storage medium) such as a flash memory provided in the AC generator 10.

In the AC generation circuit 12, the connection of the capacitor C1 and the capacitor C2 to the battery 30 side is switched to the parallel connection or the series connection by the controller 14, such that an AC current is generated according to a resonance operation of the inductance La provided in the battery 30 and at least the capacitor C1. More specifically, the AC generation circuit 12 generates a high-frequency AC current based on electric power stored in the battery 30 using a resonance operation of alternately exchanging magnetic energy stored in the inductance La provided in the battery 30 and at least electrostatic energy stored in the capacitor C1.

The AC generator 10 allows the busbar 20 to be heated by applying the AC current generated by the AC generation circuit 12 to the busbar 20 (allowing the AC current to flow through the busbar 20) and allows the temperature of the battery 30 to be raised.

First Embodiment

[Example of Structure of Busbar]

Figure 3:
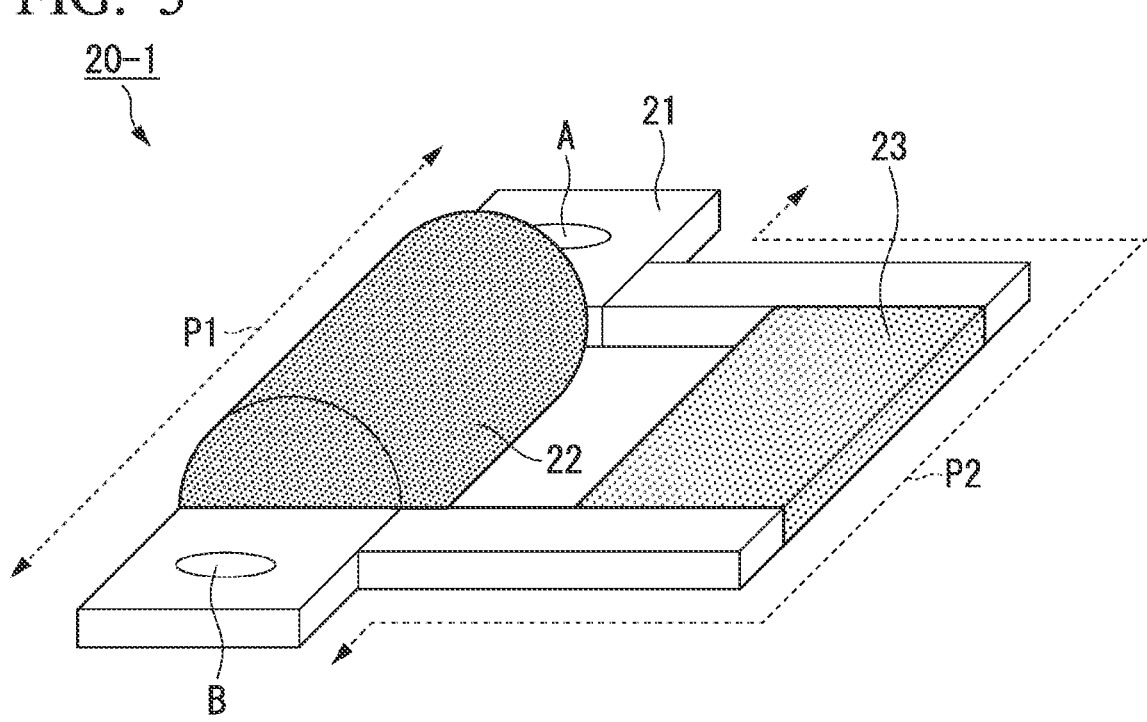
FIG. 3 is a diagram showing an example of a structure of a busbar of a first embodiment.

FIG. 3 is a diagram showing an example of a structure of the busbar 20 (hereinafter referred to as a "busbar 20-1") of the first embodiment. The busbar 20-1 is mainly formed of a metallic conductor 21. At both ends of the metallic conductor 21, two terminal holes (a terminal hole A and a terminal hole B) to which a terminal portion of the battery 30, a terminal for the AC generator 10 to output an AC current, a terminal for supplying electric power of the vehicle M, and the like are connectable are formed. The busbar 20-1 has two current paths P1 and P2 between the terminal hole A and the terminal hole B. In the busbar 20-1, the current path P1 includes a reactor 22, and the current path P2 includes a resistor 23.

The reactor 22 is, for example, a reactor for a large current having a resistance component and an inductance component. A resistance value of the resistance component provided in the reactor 22 is so small that it can be ignored. The resistor 23 is a resistor whose resistance value of the resistance component is larger than the resistance value of the resistance component provided in the reactor 22. Although it is also conceivable to include an inductance component in the resistor 23, the number of inductance components provided in the resistor 23 is so small that it can be ignored.

According to such a configuration, in the busbar 20-1, a charging/discharging-specific current of the battery 30 flows via the current path P1 in a normal charging/discharging operation of the battery 30. On the other hand, when the temperature of the battery 30 is raised by the busbar 20-1, the AC current generated by the AC generator 10 flows via the current path P2.

In the busbar 20-1, the current path P1 is an example of a "first path" in the claims and the current path P2 is an example of a "second path" in the claims.

Figure 4:
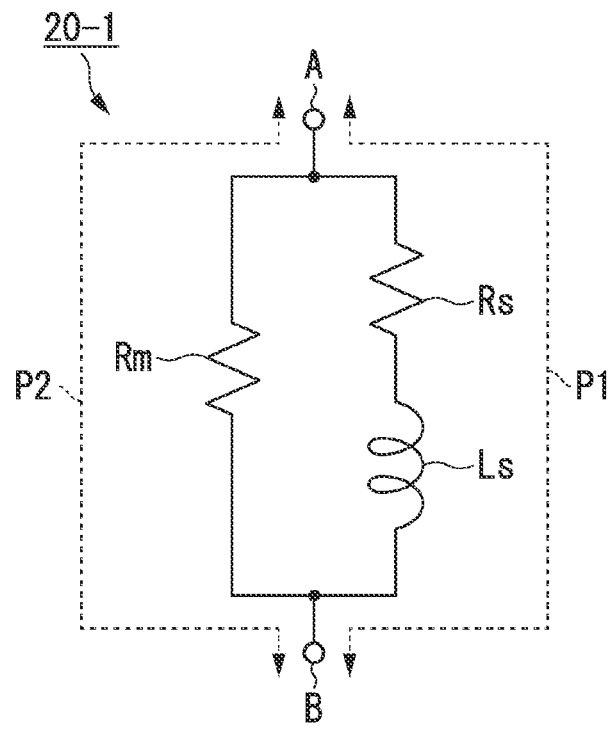
FIG. 4 is an example of a circuit equivalent to the busbar of the first embodiment.

FIG. 4 is an example of a circuit equivalent to the busbar 20-1 of the first embodiment. In FIG. 4, the resistance component provided in the reactor 22 is denoted by "Rs" and the inductance component is denoted by "Ls." In FIG. 4, the resistance component provided in the resistor 23 is denoted by "Rm." When a charging/discharging current flows between the terminal hole A and the terminal hole B, the current flows via the current path P1 having a smaller resistance value in the busbar 20-1 according to characteristics corresponding to each of the resistance component Rs and the inductance component Ls provided in the reactor 22. On the other hand, when an AC current has flowed between the terminal hole A and the terminal hole B, a flow of the high-frequency AC current for the current path P1 is limited by the inductance component Ls provided in the reactor 22 and the high-frequency AC current flows according to characteristics corresponding to the resistance component Rm provided in the resistor 23 via the current path P2 having a larger resistance value in the busbar 20-1. Thereby, in the busbar 20-1, the resistor 23 generates heat according to the AC current that has flowed.

In the busbar 20-1, the resistance component Rs is an example of a "first resistance component" in the claims and the inductance component Ls is an example of an "inductance component" in the claims. In the busbar 20-1, the resistance component Rm is an example of a "second resistance component" in the claims.

Figure 5:
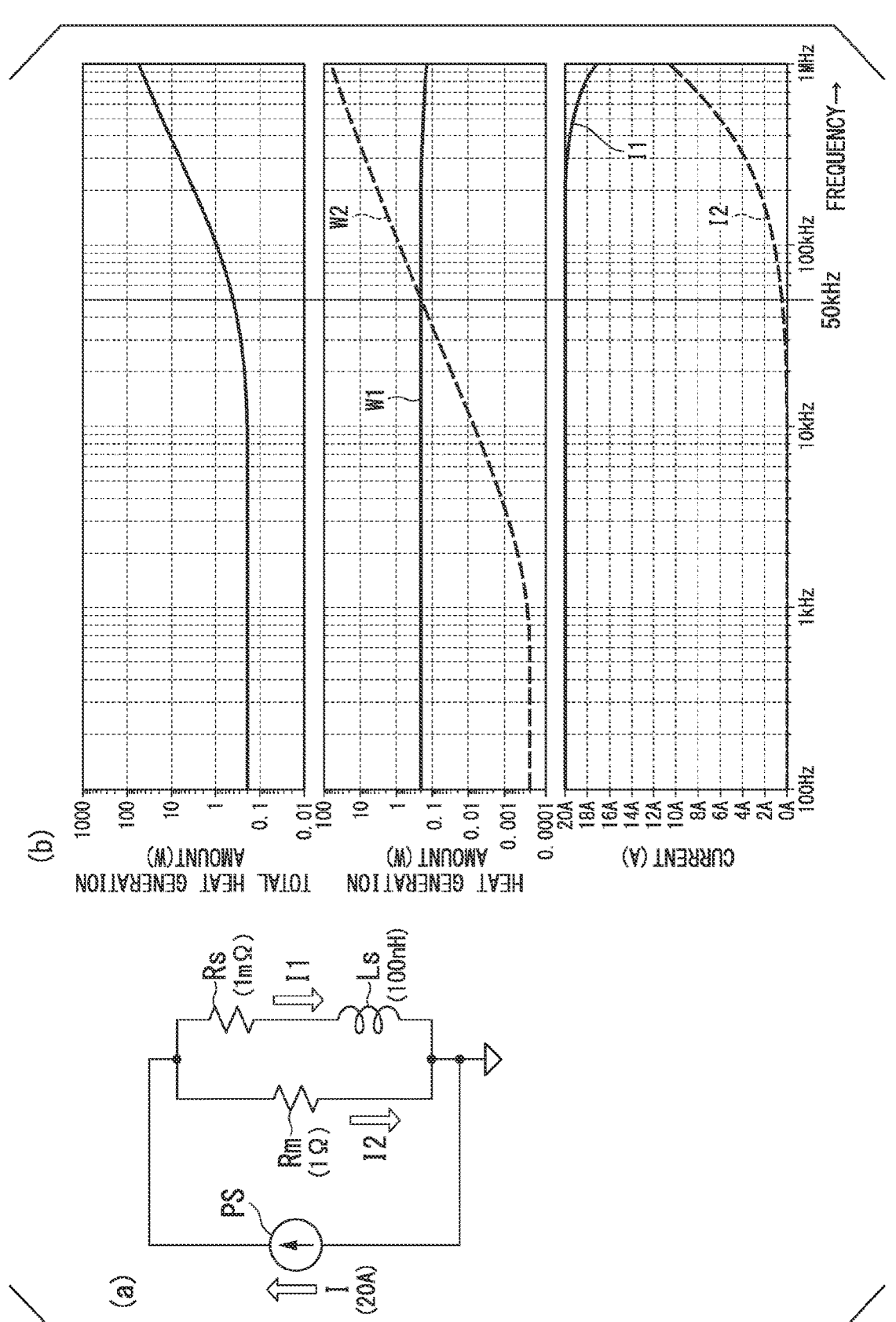
FIG. 5 is a diagram showing an example of heat generation characteristics in the busbar of the first embodiment.

Here, a relationship between the frequency of a current flowing through the busbar 20-1 and a heat generation amount will be described. FIG. 5 is a diagram showing an example of heat generation characteristics in the busbar 20-1 of the first embodiment. In (a) of FIG. 5, an example of a circuit in which a power supply PS applies a current having the same current value and a different frequency to a circuit equivalent to the busbar 20-1 shown in FIG. 4 is shown. In (b) of FIG. 5, an example of changes in a current flowing along each current path and a heat generation amount for the frequency in the example of the circuit shown in (a) of FIG. 5 is shown. More specifically, in (b) of FIG. 5, changes in a current I1 flowing along the current path P1, a current I2 flowing along the current path P2, a heat generation amount W1 in the current path P1, a heat generation amount W2 in the current path P2, and a total heat generation amount of the busbar 20-1 for each frequency are shown. In (a) of FIG. 5, an example of a direction in which each of the current I1 and the current I2 flows is shown. The example shown in FIG. 5 is an example when the power supply PS has applied a current I of a sinusoidal wave having the amplitude of a current value of 20 [A] to the busbar 20-1 having an inductance component Ls of 100 [nH] provided in the reactor 22, a resistance component Rs of 1 [mΩ], and a resistance component Rm of 1 [Ω] provided in the resistor 23.

As shown in the lower part of (b) of FIG. 5, when the power supply PS has applied, for example, a current I having a frequency of 50 [KHz] or less to the busbar 20-1, the current I1 corresponding to the applied current I flows along the current path P1, but the current I2 hardly flows along the current path P2 due to the resistor 23. Thus, as shown in the middle part of (b) of FIG. 5, when the current I having the frequency of 50 [KHz] or less has been applied, it can be said that a main heat generation amount is the heat generation amount W1 in the current path P1 along which the current I1 is flowing and the heat generation amount W2 in the current path P2 is almost absent.

Accordingly, as shown in the upper part of (b) of FIG. 5, the total heat generation amount of the busbar 20-1 is the heat generation amount corresponding to the heat generation amount W1. In other words, when the current I having the frequency of 50 [kHz] or less has been applied, the busbar 20-1 hardly generates heat.

On the other hand, as shown in the lower part of (b) of FIG. 5, when the power supply PS has applied a current I of a frequency exceeding, for example, 50 [kHz], to the busbar 20-1, the current I2 flowing along the current path P2 gradually increases as the frequency increases. On the other hand, in the current path P1, the current I1 gradually decreases when the frequency of the current I further increases. Thus, as shown in the middle part of (b) of FIG. 5, a current path along which heat is mainly generated is changed when the frequency exceeds 50 [kHz]. More specifically, in the current path P1, the flow of the current I having a frequency exceeding 50 [kHz] is limited by the inductance component Ls provided in the reactor 22, such that the heat generation amount W1 in the current path P1 does not change, but the heat generation amount W2 in the current path P2 including the resistor 23 having a large resistance value increases as the frequency increases and heat is mainly generated in the busbar 20-1 when the frequency exceeds 50 [KHz]. Accordingly, as shown in the upper part of (b) of FIG. 5, the total heat generation amount of the busbar 20-1 gradually increases with the frequency of approximately 50 [kHz] as a boundary.

In this way, the busbar 20-1 has heat generation characteristics that a main heat generation amount is the heat generation amount W1 in the current path P1 when the frequency of the applied current I is 50 [KHz] or less and a main heat generation amount is the heat generation amount W2 in the current path P2 when the frequency exceeds 50 [KHz].

Generally, in the vehicle M, the frequency of the current associated with the charging/discharging of the battery 30 is about several Hertz (Hz) from a DC current. An upper limit of the frequency of a change in the current (a so-called ripple of the current waveform) according to the rotation of the electric motor for traveling is about several kilohertz (kHz). Further, the upper limit of the frequency of the ripple of the current waveform due to switching of, for example, an inverter or the like mounted in the vehicle M, is about several tens of kilohertz (kHz).

From this, in the temperature raising system 1, when the AC generator 10 does not generate an AC current or generates an AC current having a frequency lower than 50 [KHz], it can be seen that heat generation in the busbar 20-1 is not different from the conventional heat generation in relation to changes in the normal charging/discharging operation in the vehicle M, rotation of the electric motor for traveling, and a current waveform associated with switching of an inverter or the like. Further, in the temperature raising system 1, if the AC generator 10 generates an AC current having a frequency higher than 50 [KHz] and applies the generated AC current to the busbar 20-1, it can be seen that the temperature of the battery 30 can be intentionally raised due to heat generation of the busbar 20-1 (more specifically, heat generation of the resistor 23). Moreover, as shown in (b) of FIG. 5, the heat generation amount of the busbar 20-1 when the current I has a frequency higher than 50 [KHz] increases as the frequency of the current I increases. Thus, the temperature raising system 1 can efficiently raise the temperature of the battery 30 to the intended temperature.

[Example of Another Structure of Busbar]

Figure 6:
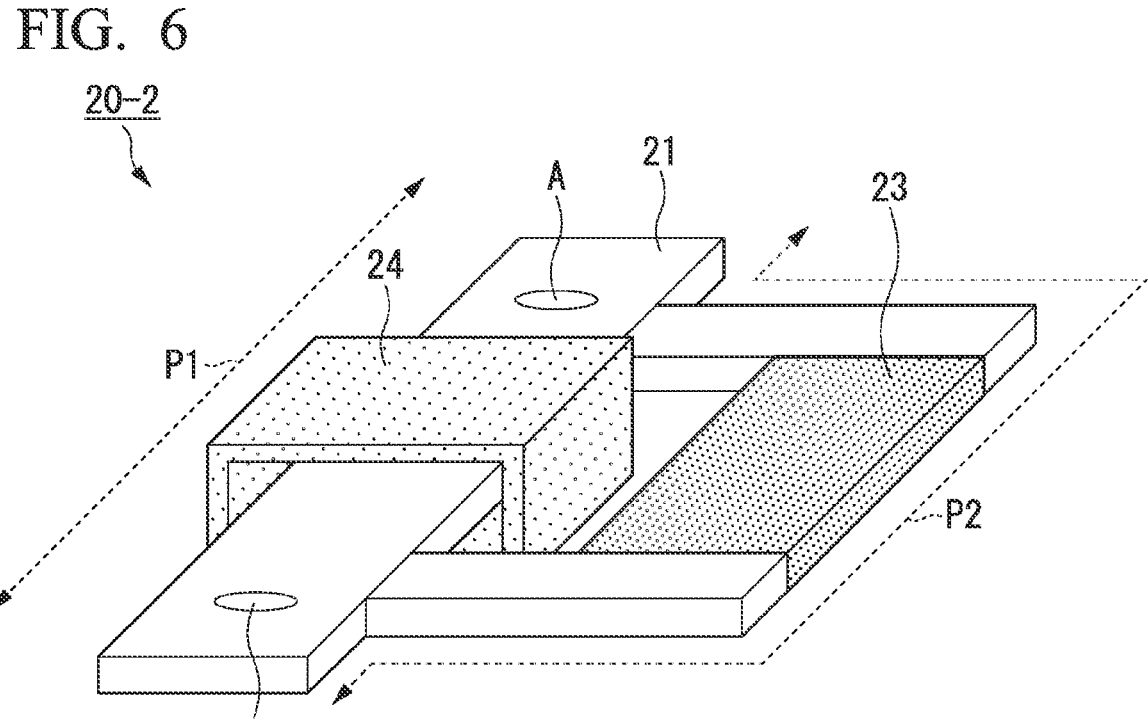
FIG. 6 is a diagram showing another example of the structure of the busbar of the first embodiment.

FIG. 6 is a diagram showing another example of the structure of the busbar 20 of the first embodiment. In the following description, another busbar 20 is referred to as a "busbar 20-2." Like the busbar 20-1, the busbar 20-2 is also mainly formed of a metallic conductor 21 and the terminal hole A and the terminal hole B are formed at both ends of the metallic conductor 21. The busbar 20-2 also has two current paths P1 and P2 between the terminal hole A and the terminal hole B like the busbar 20-1. In the busbar 20-2, a magnet 24 is provided to surround the metallic conductor 21 of the current path P1. The current path P2 in the busbar 20-2 includes a resistor 23 as in the busbar 20-1.

A circuit equivalent to the busbar 20-2 is similar to a circuit equivalent to the busbar 20-1 shown in FIG. 4. In the busbar 20-2, the resistance component of the current path P1 replaces a resistance component of the metallic conductor 21 itself and the inductance component thereof replaces an inductance component generated by a current flowing (passing) through the inside surrounded by the magnet 24. Even in the busbar 20-2, as in the busbar 20-1, when the charging/discharging current has flowed between the terminal hole A and the terminal hole B, the current also flows via the current path P1 having a smaller resistance value. When an AC current has flowed between the terminal hole A and the terminal hole B as in the busbar 20-1 even in the busbar 20-2, the flow of the AC current for the current path P1 is limited by the inductance component generated by the magnet 24 and the resistor 23 generates heat in accordance with the AC current having flowed via the current path P2.

According to such a configuration, even in the busbar 20-2, as in the busbar 20-1, the charging/discharging current of the battery 30 flows via the current path P1 in the normal charging/discharging operation of the battery 30 and the AC current generated by the AC generator 10 flows via the current path P2 to generate heat when the temperature of the battery 30 is raised. Even in the busbar 20-2, a difference in the frequency of the current I for changing the current path of main heat generation is also taken into account in a relationship between the frequency of the flowing current and the heat generation amount, but this relationship is equivalent to a relationship between the frequency of the current and the heat generation amount in the busbar 20-2 shown in FIG. 5. Accordingly, even in the busbar 20-2, as in the busbar 20-1, the temperature raising system 1 can intentionally raise the temperature of the battery 30 according to heat generation of the busbar 20-2 (more specifically, heat generation of the resistor 23) when the AC generator 10 generates a high-frequency AC current and applies the AC current to the busbar 20-2.

In this way, in the busbar 20 of the first embodiment, the inductance component Ls and the resistance component Rs having a small resistance value capable of being ignored are provided in the current path P1 and the resistor 23 having the resistance component Rm larger than the resistance component Rs is provided in the current path P2. The busbar 20 of the first embodiment does not generate heat when the charging/discharging current flows along the current path P1 in the normal charging/discharging operation of the battery 30 and allows a high-frequency AC current generated by the AC generator 10 provided in the temperature raising system 1 to flow along the current path P2, such that the resistor 23 generates heat. Thereby, in the busbar 20 of the first embodiment, the temperature of the battery 30 can be intentionally raised.

Second Embodiment

[Example of Structure of Busbar]

Figure 7:
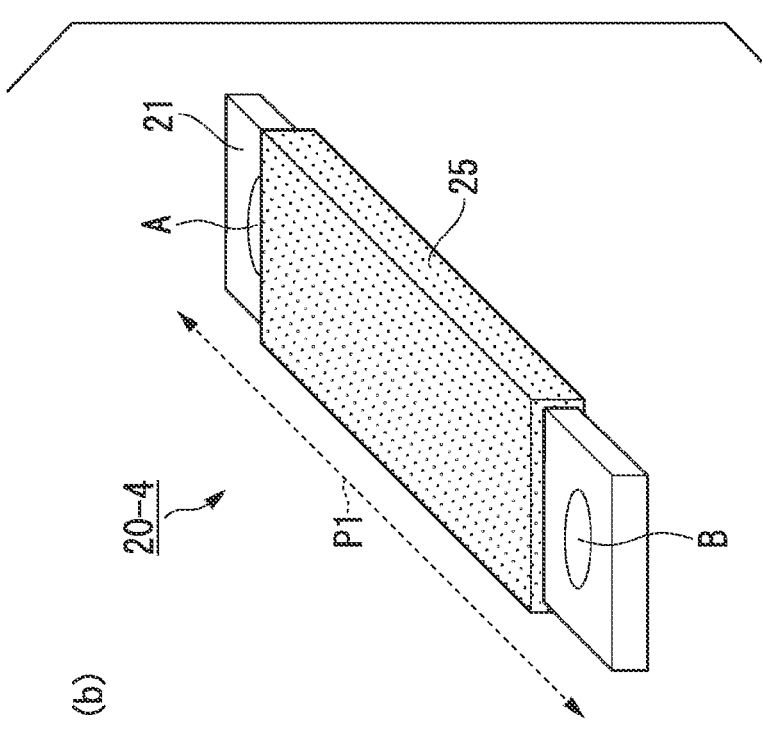
FIG. 7 is a diagram showing an example of a structure of a busbar of a second embodiment.
Figure 7:
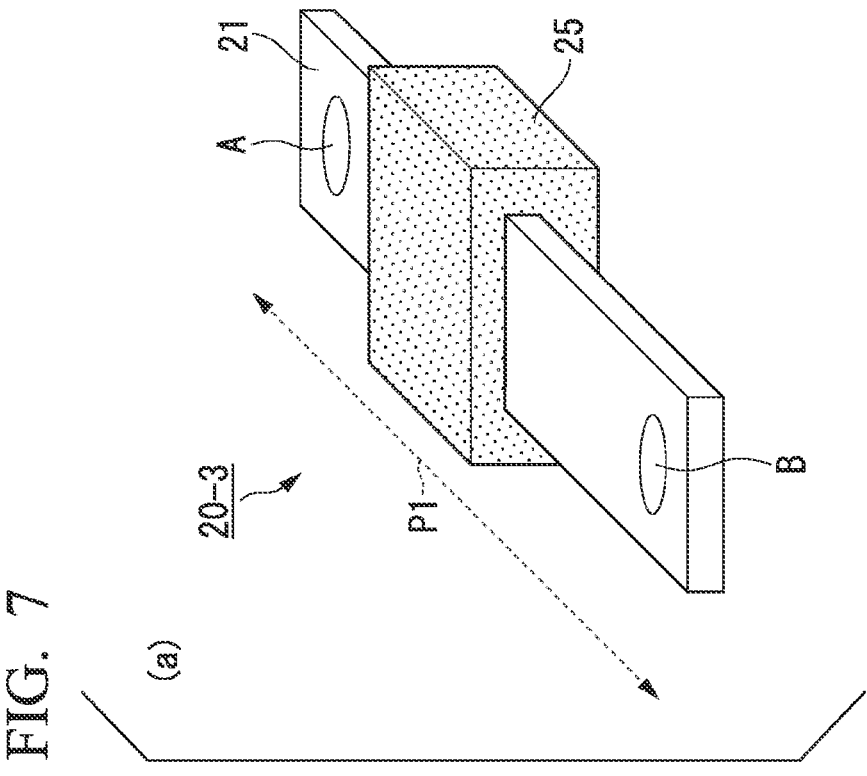

FIG. 7 is a diagram showing an example of a structure of a busbar 20 of a second embodiment. The busbar 20 of the second embodiment is also mainly formed of a metallic conductor 21 like the busbar 20-1 and the busbar 20-2 of the first embodiment and a terminal hole A and a terminal hole B are formed at both ends of the metallic conductor 21. In the busbar 20 of the second embodiment, there is only one current path along which a current flows between the terminal hole A and the terminal hole B. In the following description, one current path in the busbar 20 of the second embodiment is referred to as a "current path P1." In the busbar 20 of the second embodiment, a magnet 25 is provided to surround the metallic conductor 21 of the current path P1. In FIG. 7, two examples in which the busbar 20 of the second embodiment includes a magnet 25 and a structure thereof is different are shown. More specifically, the busbar 20 (hereinafter referred to as a "busbar 20-3") of the second embodiment having a structure in which the magnet 25 is provided to surround a part of the metallic conductor 21 of the current path P1 is shown in (a) of FIG. 7 and the busbar 20 (hereinafter referred to as a "busbar 20-4") of the second embodiment having a structure in which the magnet 25 is provided to cover a surface of the metallic conductor 21 of the current path P1 is shown in (b) of FIG. 7.

The magnet 25 has characteristics that when a high-frequency magnetic field (an AC magnetic field) is applied, heat is generated by a high-frequency magnetic flux passing through the inside of the magnet 25. The material of the magnet 25 is equivalent to, for example, a magnetic material called magnetic nanoparticles used for cancer treatment (heat treatment) and the like in the medical field.

In the busbar 20-3, for example, the magnet 25 of magnetic nanoparticles is formed in close contact with the metallic conductor 21. In the busbar 20-4, for example, powdery magnetic nanoparticles are kneaded with a binder and applied to a surface of the metallic conductor 21. Thereby, in the busbar 20-3 and the busbar 20-4, the magnet 25 itself generates heat due to a high-frequency magnetic flux corresponding to the high-frequency magnetic field generated by a high-frequency AC current flowing (passing) between the terminal hole A and the terminal hole B. In the busbar 20-3 or the busbar 20-4, the heat generated by the magnet 25 is transferred to the metallic conductor 21, such that the temperature of the busbar 20-3 itself or the busbar 20-4 itself rises.

According to such a configuration, in the busbar 20-3 and the busbar 20-4, the magnet 25 does not generate heat in a DC current or a low-frequency AC current flowing in the normal charging/discharging of the battery 30 and the magnet 25 generates heat according to a high-frequency AC current generated by the AC generator 10. Although a relationship between the frequency of the current flowing through the busbar 20-3 or the busbar 20-4 and the heat generation amount is considered to have a difference in the temperature of heat generation or the frequency of the current I from a relationship between the frequency of the current and the heat generation amount in the busbar 20-2 shown in FIG. 5, it is possible to easily confirm heat generation characteristics in the busbar 20-3 or the busbar 20-4. Accordingly, even in the busbar 20-3 and the busbar 20-4, as in the busbar 20-1 and the busbar 20-2, it is possible to raise the temperature of the battery 30 intentionally according to heat generation of the busbar 20-3 and the busbar 20-4 (more specifically, the heat generation of the magnet 25) when the AC generator 10 generates and applies a high-frequency AC current in the temperature raising system 1.

In this way, in the busbar 20 of the second embodiment, the magnet 25 is provided in the current path P1. In the busbar 20 of the second embodiment, the magnet 25 does not generate heat in the normal charging/discharging operation of the battery 30 and the magnet 25 generates heat when a high-frequency AC current generated by the AC generator 10 provided in the temperature raising system 1 flows through the current path P1. Thereby, the temperature of the battery 30 can be intentionally raised even in the busbar 20 of the second embodiment.

Third Embodiment

[Example of Structure of Busbar]

Figure 8:
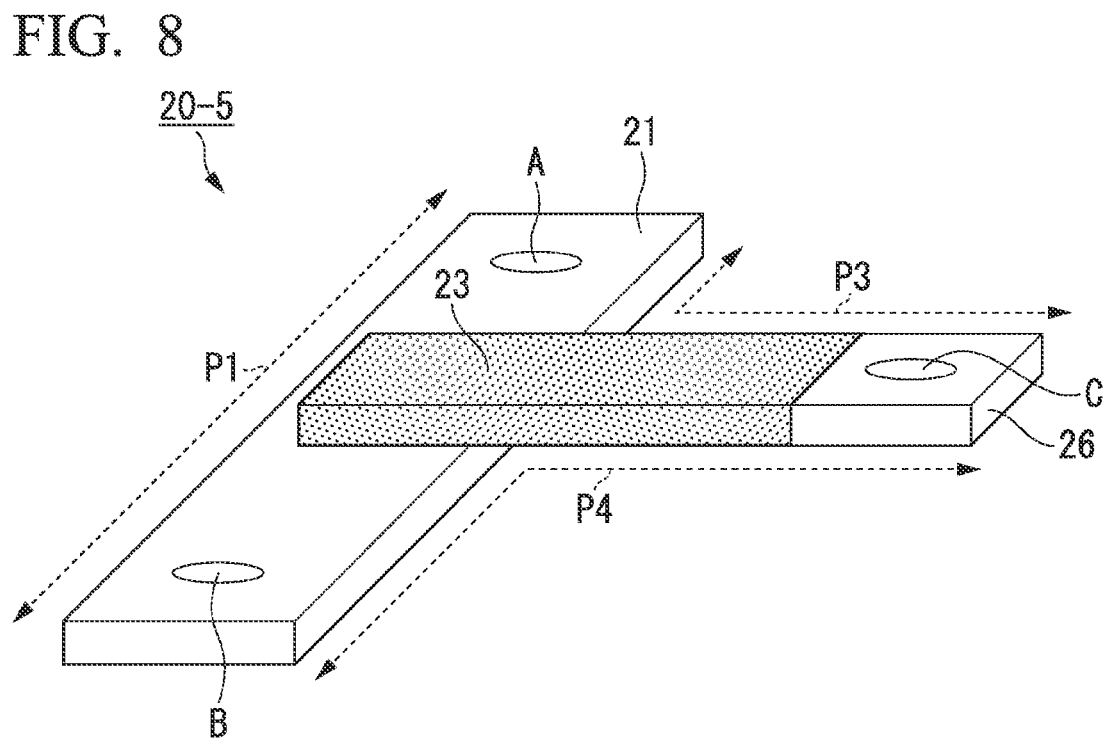

FIG. 8 is a diagram showing an example of a structure of the busbar 20 (hereinafter referred to as a "busbar 20-5") of a third embodiment. Like the busbar 20-1 and the busbar 20-2 of the first embodiment and the busbar 20-3 and the busbar 20-4 of the second embodiment, the busbar 20-5 is also mainly formed of a metallic conductor 21 and a terminal hole A and a terminal hole B are formed at both ends of the metallic conductor 21. In the busbar 20-5, a metallic conductor 26 including a resistor 23 is connected to, for example, a central portion of the metallic conductor 21, and is formed in a T-shape as a whole. In the busbar 20-5, a connection portion between the metallic conductor 21 and the metallic conductor 26 (i.e., a branch portion from the metallic conductor 21) is connected in a state in which thermal resistance between the metallic conductor 21 and the resistor 23 is reduced. A terminal hole C similar to the terminal hole A or the terminal hole B is formed at an end of the metallic conductor 26 opposite to the branch portion. The busbar 20-5 has three current paths of a current path P1 between the terminal hole A and the terminal hole B, a current path P3 between the terminal hole A and the terminal hole C, and a current path P4 between the terminal hole B and the terminal hole C.

According to such a configuration, the charging/discharging current of the battery 30 flows via the current path P1 in the normal charging/discharging operation of the battery 30 in the busbar 20-5 and heat is generated due to an AC current generated by the AC generator 10 flowing via the current path P3 or the current path P4 when the temperature of the battery 30 is raised. In the busbar 20-5, the reactor 22 and the magnet 24 in the busbar 20-1 and the busbar 20-2 of the first embodiment are not provided in the current path P1. Thus, the charging/discharging current of the battery 30 flowing via the current path P1 does not generate heat in the normal charging/discharging operation of the battery 30 and the resistor 23 generates heat when the AC current generated by the AC generator 10 flows via the current path P3 or the current path P4. Accordingly, even in the busbar 20-5, as in the busbars 20-1 to 20-4, it is possible to raise the temperature of the battery 30 intentionally according to heat generation of the busbar 20-5 (more specifically, heat generation of the resistor 23) when the AC generator 10 generates an AC current and applies the AC current to the current path P3 or the current path P4 of the busbar 20-5 in the temperature raising system 1.

In the busbar 20-5, the current path P1 is an example of a "first path" in the claims and the current path P3 and the current path P4 are examples of a "second path" in the claims.

Moreover, the shape of the busbar 20-5 is a T-shape. Thus, the busbar 20-5 is configured such that the temperature is raised for each of the batteries 30, for example, when the battery 30 mounted in the vehicle M has a configuration in which a plurality of (for example, two) batteries 30 are combined, and is applied more easily.

[Example of Application of Busbar]

Figure 9:
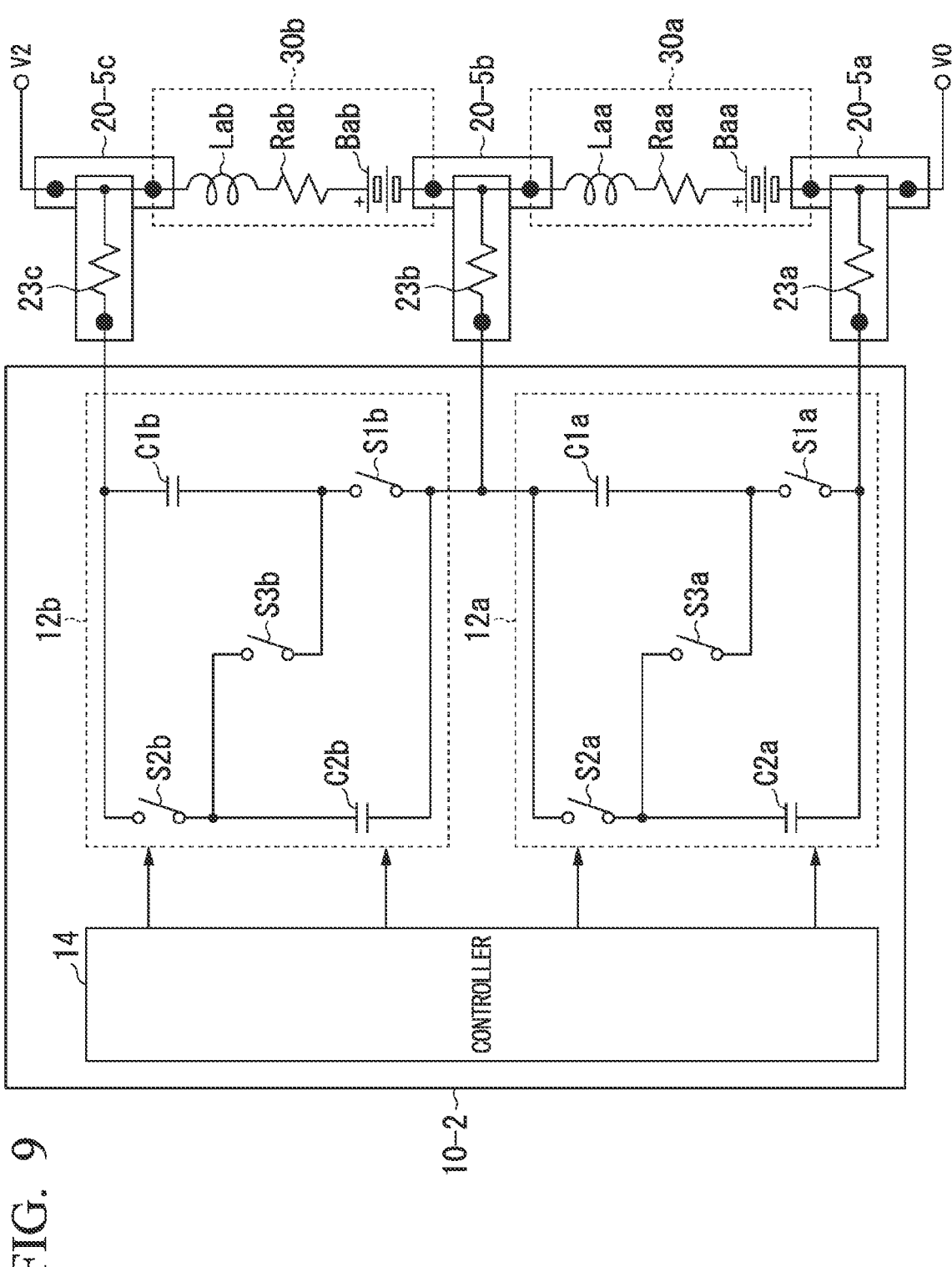
FIG. 9 is a diagram showing an example in which the busbar of the third embodiment is applied.

FIG. 9 is a diagram showing an example in which the busbar 20-5 of the third embodiment is applied. FIG. 9 is an example in which busbars 20-5 (a busbar 20-5a, a busbar 20-5b, and a busbar 20-5c) are connected when the battery 30 has a configuration in which two batteries 30 (a battery 30a and a battery 30b) are combined.

When the battery 30 has a configuration in which the battery 30a and the battery 30b are combined, one of the AC generation circuits 12 (an AC generation circuit 12a and an AC generation circuit 12b) is connected to each battery 30 and the controller 14 controls the generation of an AC current in each AC generation circuit 12. That is, the controller 14 alternately switches the connection of the capacitor C1 and the capacitor C2 provided in the AC generation circuit 12 to which the battery 30 whose temperature is raised is connected to the battery 30 side between the parallel connection and the series connection. Because a method of switching the connection between the parallel connection and the series connection of the capacitor C1 and the capacitor C2 in the controller 14, i.e., a method of controlling the conductive state and the non-conductive state of the switch provided in each AC generation circuit 12, is similar to the control method of the controller 14 described with reference to FIG. 2, a detailed description thereof will be omitted.

Thereby, in the temperature raising system 1, the busbar 20-5 corresponding to either one or both of the AC generation circuit 12a and the AC generation circuit 12b that are allowed to generate AC currents by the controller 14 generates heat (more specifically, a resistor 23a, a resistor 23b, and a resistor 23c generate heat) and the temperature of the battery 30 (either one or both of the battery 30a and the battery 30b) to which the busbar 20-5 having generated heat is connected can be intentionally raised.

In the example in which the busbar 20-5 shown in FIG. 9 is applied, the battery 30a and the battery 30b are examples of a "power storage" in the claims and the configuration in which the batteries 30a and the batteries 30b are combined is an example of a "power storage battery" in the claims.

In this way, in the busbar 20 of the third embodiment, the resistor 23 is provided on the metallic conductor 26 branching from the metallic conductor 21. Thereby, the busbar 20 of the third embodiment does not generate heat when the charging/discharging current flows along the current path P1 in the normal charging/discharging operation of the battery 30 and allows an AC current generated by the AC generator 10 provided in the temperature raising system 1 to flow along the current path P3 or the current path P4, such that the resistor 23 generates heat. Thereby, the temperature of the battery 30 can be intentionally raised even in the busbar 20 of the third embodiment.

As described above, according to the busbar 20 of each embodiment, a configuration in which heat is generated according to the AC current generated by the AC generator 10 is provided. Thereby, in the temperature raising system 1 including the busbar 20 of each embodiment, the charging/discharging current can flow in the normal charging/discharging operation of the battery 30 and the temperature of the battery 30 can be intentionally raised when the AC generator 10 generates the AC current. Moreover, because the busbar 20 of each embodiment is connected to a terminal portion where a heat transfer to the entire battery 30 is suitable, the temperature of the battery 30 can be raised more efficiently. Thereby, in the vehicle M in which the temperature raising system 1 including the busbar 20 of each embodiment is adopted, the battery 30 can be used in a state in which the temperature is raised to a suitable temperature and the deterioration of the charging/discharging performance of the battery 30 can be limited.

According to the temperature raising system 1 of each of the above-described embodiment includes the AC generation circuit 12 connected to one or more batteries 30 and configured to generate an AC current; and the busbar 20 of the metallic conductor 21 connected between a terminal portion of the battery 30 and the AC generation circuit 12 or between two or more batteries 30, the busbar 20 including the current path P1 and the current path P2 along which heat is generated by allowing the AC current to flow, the current path P1 having a larger inductance component than the current path P2, whereby it is possible to raise the temperature of the battery 30 for traveling mounted in the vehicle M intentionally. Thereby, in the vehicle M in which the temperature raising system 1 of each embodiment is adopted, the battery 30 can be used in a state in which the temperature is raised to a suitable temperature and the deterioration of the charging/discharging performance of the battery 30 can be limited. Thereby, in the vehicle M equipped with the temperature raising system 1 of each embodiment, it is possible to improve the marketability of the vehicle M such as improvement of the durability. From these facts, the vehicle M equipped with the temperature raising system 1 of each embodiment is expected to contribute to improving energy efficiency and reducing adverse effects on the global environment.

In each of the above-described embodiments, a configuration in which a control device such as an ECU provided in the vehicle M controls the activation or stopping of the temperature raising system 1 and the controller 14 provided in the AC generator 10 performs a control process such that the switch provided in the AC generation circuit 12 is in a conductive state or a non-conducting state has been described. The function of the control device provided in the vehicle M may include the function of the controller 14 described above. In this case, the controller 14 may be omitted in the temperature raising system 1.

Although modes for carrying out the present invention have been described using embodiments, the present invention is not limited to the embodiments and various modifications and substitutions can also be made without departing from the scope and spirit of the present invention.

What is claimed is:

1. A temperature raising system comprising:

an alternating current (AC) generation circuit connected to a power storage battery including one or more power storages and configured to generate an AC current; and a conductive member of a metallic conductor connected between a terminal portion of the power storage battery and the AC generation circuit or between two or more power storages, the conductive member including a first path and a second path along which heat is generated by allowing the AC current to flow, the first path having a larger inductance component than the second path, wherein, in the conductive member, the first path includes a first resistance component and an inductance component, the second path includes a second resistance component, and a resistance value of the second resistance component is larger than a resistance value of the first resistance component.

2. The temperature raising system according to claim 1, wherein the first path includes a reactor having the first resistance component and the inductance component, and wherein the second path includes a resistor having the second resistance component.

3. The temperature raising system according to claim 1, wherein the first path includes a metallic conductor having the first resistance component and a magnet surrounding the metallic conductor, and wherein the second path includes a resistor having the second resistance component.

4. The temperature raising system according to claim 1, wherein the AC generation circuit includes a first capacitor having a first end connected to a positive electrode side of the power storage battery and a second capacitor having a first end connected to a negative electrode side of the power storage battery and generates the AC current according to a resonance operation of the inductance component provided in the power storage battery and at least the first capacitor by switching a connection of the first capacitor and the second capacitor to the power storage battery to a series connection or a parallel connection.

* * * * *